US00RE39840E

(19) United States
(12) Reissued Patent
Baker et al.

(10) Patent Number: US RE39,840 E
(45) Date of Reissued Patent: Sep. 18, 2007

(54) ELECTRICAL BUSHING WITH RESIN CASTING

(75) Inventors: Alfred George Baker, Dandenong South (AU); Kenneth Brett Boag, Dandenong South (AU)

(73) Assignee: Wamco Pacific Pty. Ltd., Dandenong, Victoria (AU)

(21) Appl. No.: 10/851,980

(22) Filed: May 21, 2004

Related U.S. Patent Documents

Reissue of:
(64) Patent No.: 6,610,933
Issued: Aug. 26, 2003
Appl. No.: 09/954,439
Filed: Sep. 17, 2001

U.S. Applications:
(63) Continuation of application No. PCT/AU00/00204, filed on Mar. 17, 1999.

(30) Foreign Application Priority Data

Mar. 17, 1999 (AU) ..... PP 9218

(51) Int. Cl.
*H01B 17/26* (2006.01)

(52) U.S. Cl. ..... 174/142; 174/152 R; 174/153 R; 174/158 R

(58) Field of Classification Search ..... 174/142, 174/152 R, 153 R, 158 R
See application file for complete search history.

(56) References Cited

U.S. PATENT DOCUMENTS 3,585,278 A * 6/1971 Quirk
3,801,727 A * 4/1974 Wilkinson et al.
3,829,546 A * 8/1974 Hunter et al.
3,967,051 A * 6/1976 Moore et al. ..... 174/143
5,092,798 A * 3/1992 Muench ..... 439/805
5,623,125 A * 4/1997 Pioch ..... 174/152 R
6,464,266 B1 * 10/2002 O'Neill et al. ..... 285/340

* cited by examiner

*Primary Examiner*—Jinhee Lee
(74) *Attorney, Agent, or Firm*—Thomas R. Vigil

(57) ABSTRACT

The invention in a first aspect relates to an improved cast resin bushing assembly for use in a transformer wherein the busing assembly includes a bushing which includes locating means for aligning the bushing assembly within a transformer casing; wherein the bushing further includes a locking means for releasably securing the bushing assembly to a transformer casing; a bushing conductor; and a bushing flange in circumferential arrangement with the bushing. In a second aspect the invention relates to a method of securing an improved cast resin bushing assembly to a transformer casing which bushing assembly includes a bushing which includes a locating means for aligning the bushing assembly within a transformer casing; the bushing further includes a locking means for releasably securing the bushing assembly to a transformer casing; a bushing conductor, and a bushing flange in circumferential arrangement to the bushing; wherein the transformer casing has an opening adapted to receive the bushing assembly or part thereof; and the bushing flange is mounted on the outside of the transformer casing and secured thereto by engaging the locking means on the inside of the transformer casing.

26 Claims, 5 Drawing Sheets

ELECTRICAL BUSHING WITH RESIN CASTING

Matter enclosed in heavy brackets [ ] appears in the original patent but forms no part of this reissue specification; matter printed in italics indicates the additions made by reissue.

This application is a continuation of international application number PCT/AU00/00204, filed March 17, 2000 *which claims the benefit of priority from Australian Patent Application No. PP9218 filed Mar. 17, 1999.*

FIELD OF THE INVENTION

The invention relates to improved electrical bushings with resin casting. In particular the invention relates to advances in the use of cast resin systems which enables improved fixing and sealing of an electrical bushing insulator to a transformer case.

BACKGROUND OF THE INVENTION

Typically a grid of power lines distributes electricity from either the point of generation or substations throughout both metropolitan and rural areas. Power is normally distributed at 11–36KV from the point of generation or from substations. In order to effectively supply power (electricity) for domestic use in home or business, transformers are employed at substations so as to step down the voltage to lower levels for subsequent conducting through a distribution network. Such transformers typically supply domestic users with between 110 to 450 V of electricity. Therefore transformers are subject to high input voltages and lower output voltages which supply a subsequent power distribution network.

The transformer requires insulative conductors on both the high and low voltage sides to protect the transformer from shorting to the Earth. The transformer case is usually metal and must be safely insulated. Electrical bushings provide a safe means of passing electrical current through the transformer casing. Normally an electrical conductor is sealed within such an electrical bushing so as to prevent leakage between the bushing and the conductor and to present electrical terminals extending from the interior of the transformer tank.

Electrical bushings of the prior art are produced in a variety of configurations so that they can be permanently affixed upon an electrical transformer by a welding process or the like. The bushing presents an electrical conductor through an opening in the wall of a transformer into the interior thereof which is filled with transformer oil or inert gas. Conventional bushings are provided with an insulative component and an exterior mounting flange affixed upon the component, which flange is adapted to be welded upon the transformer tank in order to permanently fix the bushing to the transformer in a way which seals the opening therein. It is a requirement that the bushing provides a mechanical seal, air to air, air to gas, or air to oil, dependent on the transformer design.

In the prior art, bushings welded upon a transformer suffer the disadvantage of sacrificing the ability of the bushing or transformer to be easily repaired or replaced. It is a frequent occurrence, due to accident or malfunction, that the bushing requires repair or replacement, however because the bushing can't be easily removed without extensive labour, complete replacement of the transformer is often the end result.

Further disadvantages of the prior art such as oil leakage, may occur because the welding process to seal the bushing into the transformer may not form a complete seal, it is often the case that such leakage will not be detected until final stages of manufacture when corrective measures are costly.

Generally the prior art can be regarded in two categories—ceramic and non-ceramic. Ceramic prior art has been limited in design due to the materials employed. For example porcelain bushings cannot be cast in asymmetrical shapes. Also, the difference in expansion coefficient between the conductor and the insulator means that the conductor can never be cast into the bushing. This limitation complicates both the assembly of the unit as a whole, the fixing of the bushing to the transformer and also the sealing of the bushing unit.

It is desirable for a bushing to be able to be held in angular relation to a transformer casing. This angular configuration is usually achieved by providing a modified transformer casing with a gusset upon which a porcelain bushing is seated. Transformer casings which are modified to include a gusset are expensive and time consuming to construct. Prior art porcelain bushings and assemblies have so far been unable to meet this desire.

Non Ceramic prior art addresses some of these shortcomings, for example the casting of the conductor into the resin system, but does not adequately address the fixing of the bushing to the transformer and sealing of the bushing to the transformer case. Prior art has also explored various metallic clamping devices on the inside or outside of the transformer, all of which detract from the insulative capacity of the bushing.

SUMMARY OF THE INVENTION

Against the foregoing background, it is an object of the present invention to overcome the disadvantages of the prior art.

It is a further object of the invention to provide an improved bushing which advances the use of cast resin systems for a bushing design.

A further object of the invention is to provide an improved bushing assembly which greatly improves and facilitates the fixing and sealing of the bushing to a transformer case. In particular the new improved bushing serves to effectively provide a mechanical seal thereby preventing any leakage, but at the same time enables easy removal of the bushing so that a transformer doesn't have to be fully replaced.

The invention in a first aspect relates to an improved cast resin bushing assembly for use in a transformer wherein the bushing assembly comprises:

a bushing which bushing includes locating means for aligning the bushing assembly or part thereof within an opening in a transformer casing;

wherein the bushing further includes a locking means for releasably securing the bushing assembly to a transformer casing;

a bushing conductor integrally moulded to said bushing; and a bushing flange in circumferential arrangement with the bushing.

In a second aspect the invention relates to a method of securing an improved cast resin bushing assembly to a transformer casing which bushing assembly comprises:

a bushing which bushing includes a locating means for aligning the bushing assembly or part thereof within an opening in a transformer casing;

the bushing further includes a locking means for releasably securing the bushing assembly to a transformer casing;

a bushing conductor integrally moulded to said bushing; and a bushing flange in circumferential arrangement to the bushing;

positioning said locating means on said bushing within said transformer opening so as to align said bushing assembly;

mounting said bushing flange on an outside surface surrounding the transformer opening;

releasably securing the bushing assembly within the transformer casing by engaging said locking means inside the transformer casing.

PREFERRED ASPECTS OF THE INVENTION

Preferably the locking means is a threaded section moulded into the bushing adapted to be engaged by a corresponding collar inside a transformer casing.

Preferably the threaded section and the collar are cast in the same mould.

Preferably the collar can be a cast resin nut.

Preferably the locating means comprises a groove or flat portion for aligning the bushing assembly within an opening in a transformer casing.

Preferably the bushing flange is adapted to be mounted on a transformer casing.

Preferably the bushing flange has up to four locating holes for additional securement to a transformer casing.

Preferably the bushing conductor is cast within the bushing.

Preferably the bushing assembly is cast in a one step mould process.

In one embodiment of the invention there is disclosed a method of releasably securing an improved cast resin bushing assembly to a transformer casing by providing a bushing assembly including:

a bushing which bushing includes a groove or flat portion for aligning the bushing assembly or part thereof within an opening in the transformer casing;

the bushing further includes a threaded section for securing the bushing assembly to the transformer casing;

a threaded collar;

a bushing conductor integrally moulded to said bushing; and a bushing flange in circumferential arrangement with the bushing;

positioning said locating means on said bushing within said transformer opening so as to align said bushing assembly;

mounting said bushing flange on an outside surface surrounding the transformer opening;

releasably securing the bushing assembly within the transformer casing by engaging the threaded section on the bushing on the inside of the transformer casing with the threaded collar.

In a further specific embodiment it is preferred that the collar is a cyclo nut. In yet a further preferred embodiment the bushing flange includes locking holes which can be used as an additional or alternate means of securing the bushing assembly to the transformer casing whereby studs or nuts are lockably engaged to secure the bushing flange against the transformer casing.

Preferably the cast resin system is selected from Epoxy, Phenolic, Polyester, Vinyl Ester, Polyurethane and related composites. More preferably the cast resin system is a cycloaliphatic Epoxy Resin System.

Preferably the bushing assembly is cast in asymmetric or symmetric design.

Preferably the improved bushing assembly further comprises a flange moulded to the bushing wherein the flange is substantially annular and has an outside diameter larger than the transformer opening.

Preferably the threaded section of the bushing is cast in a resin moulding together with a complementary nut or collar.

In use customers have a choice as to which arrangement best suits their purpose. In some instances for example in subterranean applications the threaded cast resin section and nut or collar are preferred because the use of studs in this application may be a point of potential corrosion initiation.

BRIEF DESCRIPTION OF THE VIEW OF THE DRAWINGS

INTEGER LIST

Figure 1:
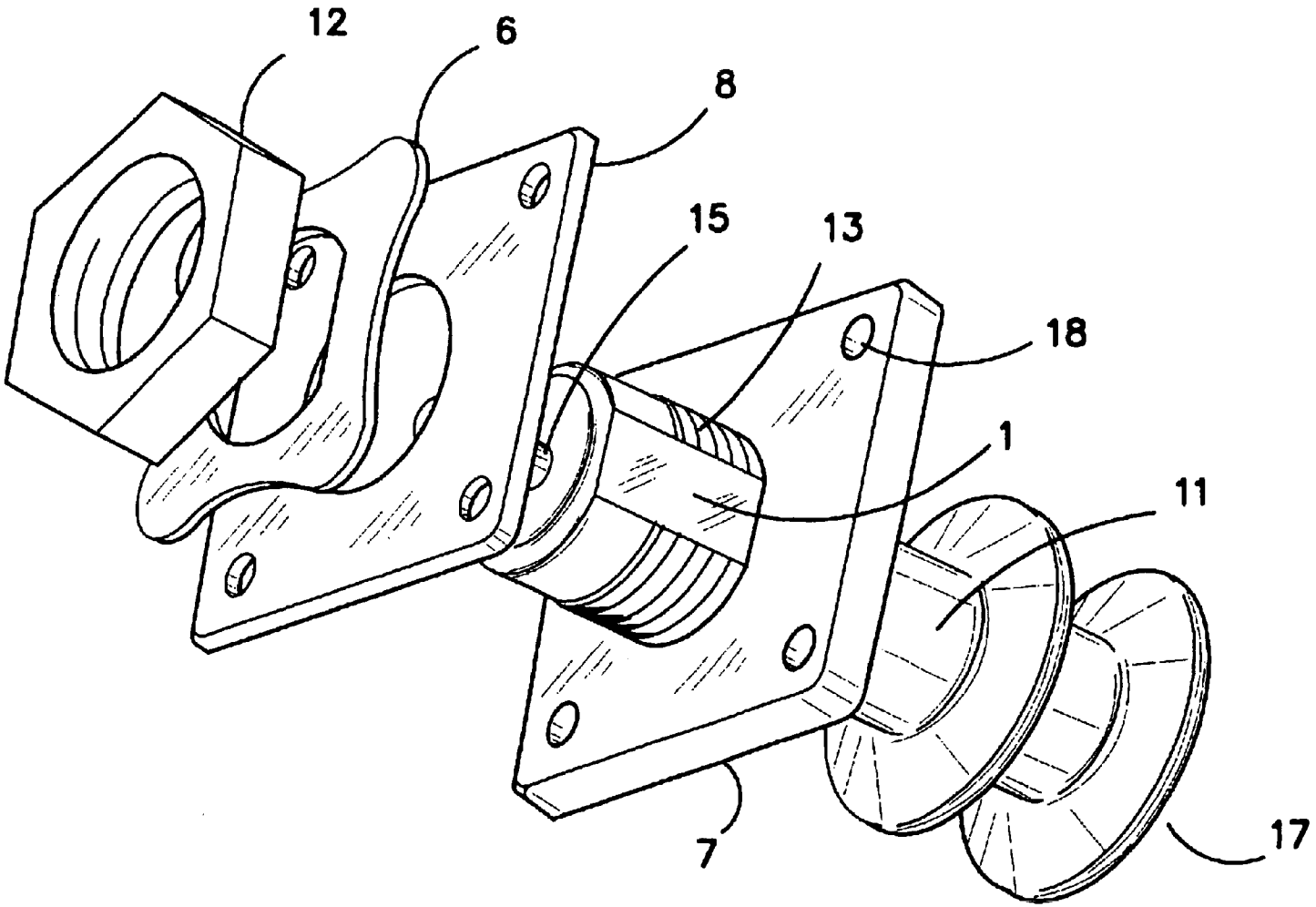
FIG. 1 is a perspective view of the improved bushing assembly.

1. Locating means
5. Transformer lid
6. Gasket
7. Flange
8. Washer
9. Nut
10. Bolt
11. Bushing
12. Nut or collar
13. Cast threaded section
15. Conductor
16. Transformer casing
17. Cast resin moulded section
18. Moulded openings

DETAILED DESCRIPTION WITH RESPECT TO THE DRAWINGS

As previously noted, this invention relates to an improved electrical bushing assembly which facilitates fixing and sealing of a bushing to a transformer case but which does not detract from the insulative capacity of the bushing.

Referring now to the drawings, there is shown in one embodiment of the invention a bushing assembly adapted to be received within an opening which comprises either one of two types of locking means for releasably sealing a bushing 11 to a transformer casing 16. The bushing assembly comprises a cast resin moulded section 17 which section includes a flange 7 adapted to be mounted on a transformer lid 5, a bushing 11 and bushing conductor 15 integrally moulded thereto. The bushing assembly shows a threaded section 13 immediately below the flange (7) adapted to be engaged by a nut or collar 12 inside the transformer casing (16). There is also shown a flattened or grooved section 1 on the bushing 11 so as to enable alignment of the bushing in the transformer casing.

In general the bushing assembly 17 is adapted to be received within an opening in a transformer casing 16 and the bushing flange 7 is adapted to be mounted or secured on the transformer casing. It is understood that a part of the bushing assembly is exposed to air while another part thereof, housed within the transformer casing is exposed to an oil environment.

Figure 2:
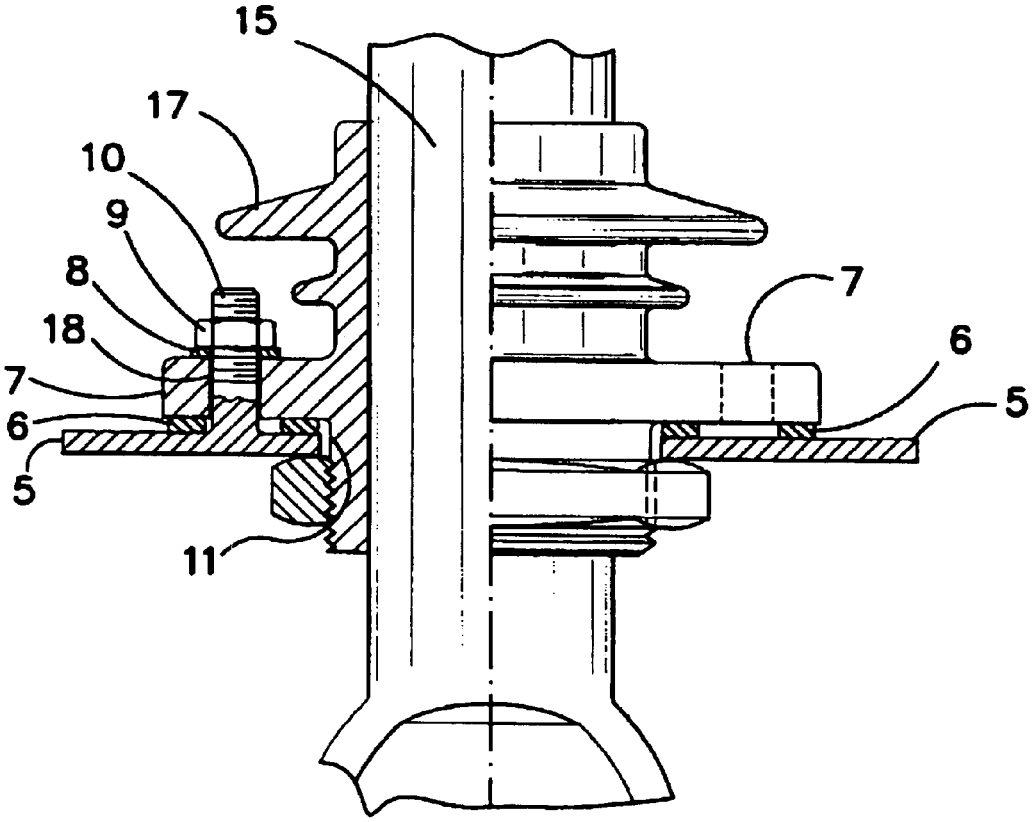
FIG. 2 is an enlarged cross-sectional view of a bushing assembly connected to a transformer casing.
Figure 3:
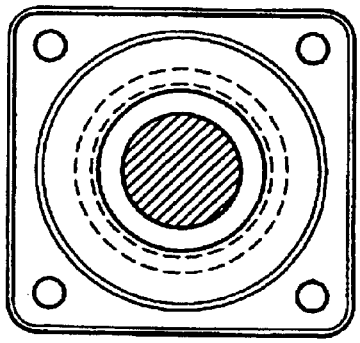
FIG. 3 is an elevated view in cross section.

In the embodiment described by FIG. 2 there is shown two types of locking means. In a first type, the bushing 11 can be fixed and sealed in position by means of passing bolts 10 located on the transformer lid 5 through moulded openings in the flange 7 wherein a nut 9 is disposed on the bolt and tightened thereof. In order to provide an air tight seal the nut 9 is screwed down against a washer 8 disposed between the nut and the flange and the flange is urged against a gasket 6 to form a seal with the transformer lid.

In a second type there is shown a cast resin threaded section 13 which is integrally moulded with the bushing 11. The threaded section 13 is disposed internally of the transformer casing 16 while the bushing flange 7 is mounted on transformer lid 5 and the bushing 11 is securely fixed and sealed in position by tightening a collar 12 about the threaded section 13. The collar 12 may be cast from the same resin system as the threaded section 13 or indeed even the same mould so that the threaded section and collar compliment the insulative value of the bushing. In this respect the prior art has explored various metallic clamping devices on the inside or outside of the transformer all of which detract from the insulative capacity of the bushing.

Figure 4:
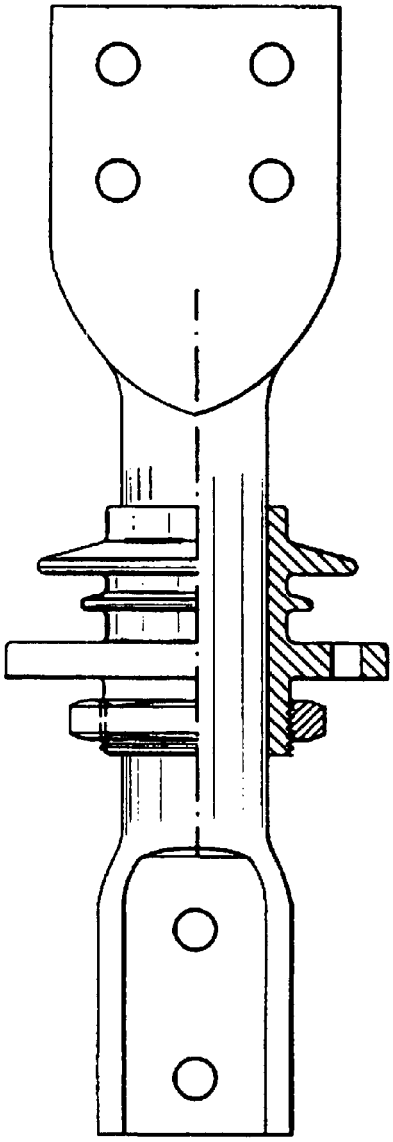
FIG. 4 is a plan view of a transformer showing a threaded section held in place by a matching collar.
Figure 5:
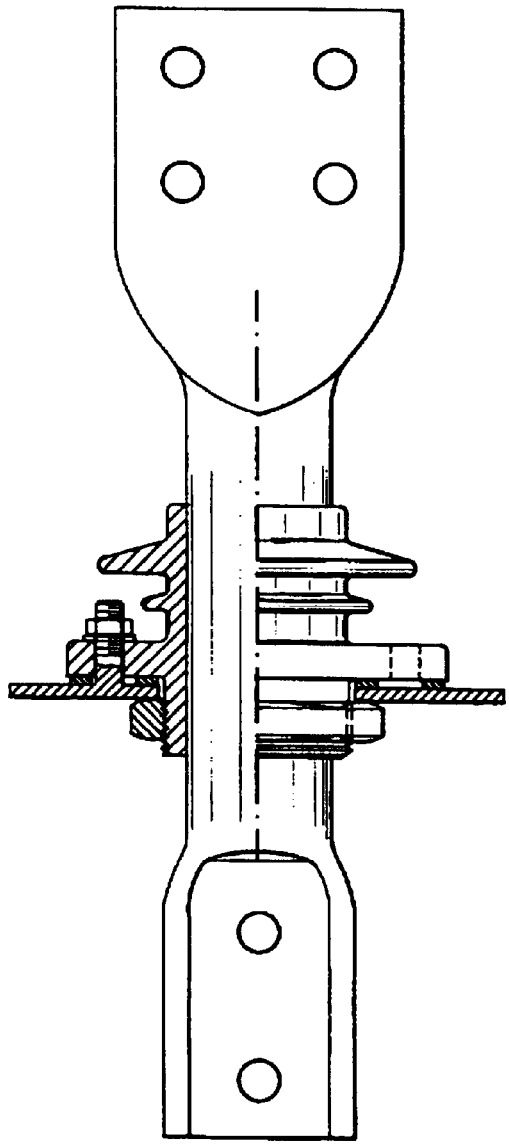
FIG. 5 is a reduced plan view of FIG. 2.

In a further preferred embodiment of the invention in FIG. 4 there is shown a bushing assembly secured to a transformer casing which bushing assembly is of the second type as described previously employing a cast resin threaded section. It is noted in this embodiment referring to FIG. 4 that points of potential corrosion created by the use of bolts welded to the transformer lid are avoided.

In each of the embodiments it is understood that not only do the different bushing assemblies mechanically fix and seal the bushing within the transformer but they enable easy removal and replacement of component parts so as to obviate the need to completely replace a transformer.

Figure 6A:
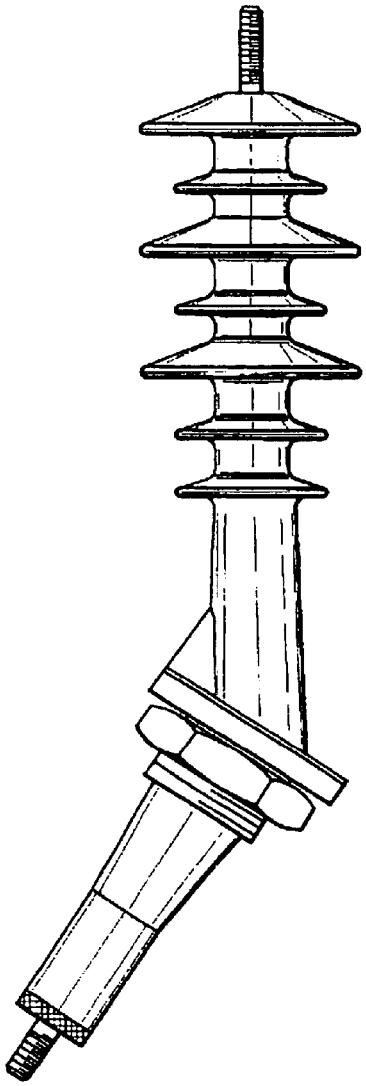
FIG. 6A is an elevational view of one embodiment of a electrical bushing constructed according to the teachings of the present invention.
Figure 6B:
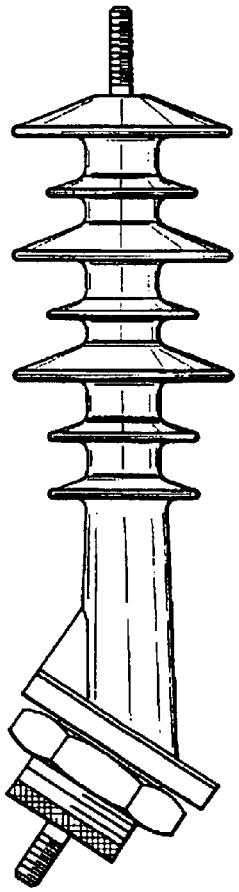
FIG. 6B is an elevational view of another embodiment of an electrical bushing constructed according to the teachings of the present invention.
Figure 6C:
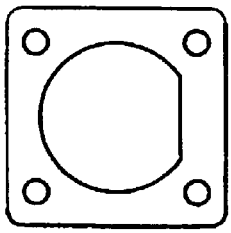
FIG. 6C is a plan view of a gasket for being received over a cylindrical part with a flat.
Figure 7A:
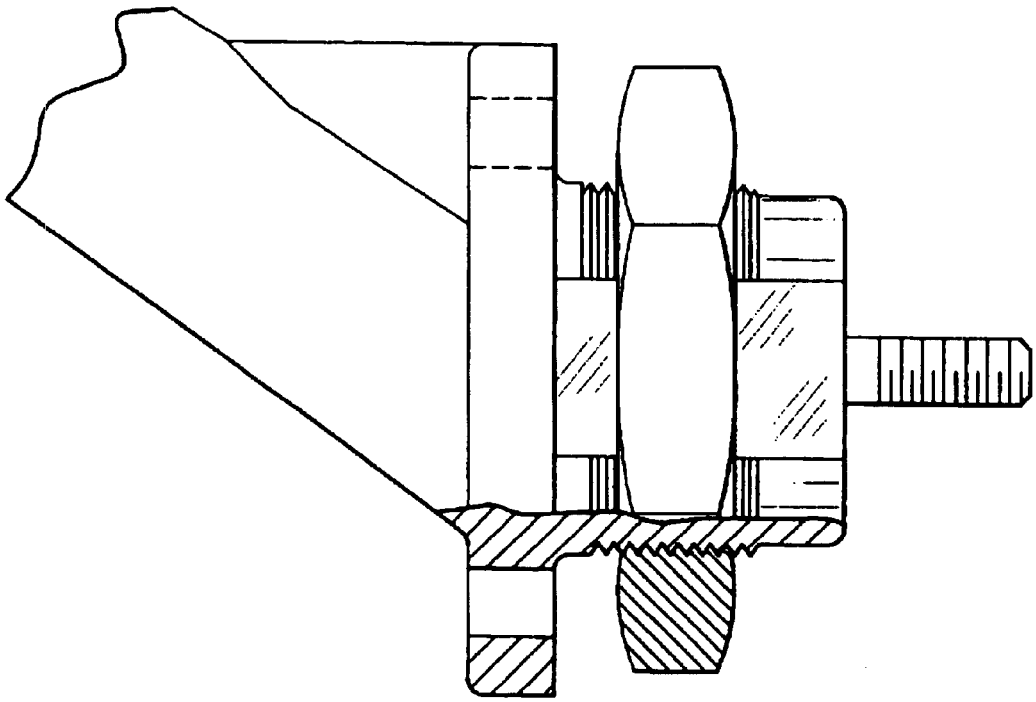
FIG. 7A is a side elevational view of an electrical bushing constructed according to the teachings of the present invention with portions broken away and with portions shown in section to show the assembly of a nut on the bushing.
Figure 7B:
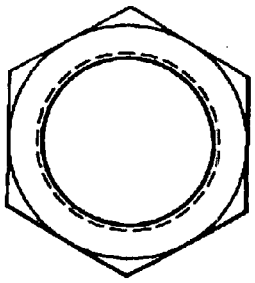
FIG. 7B is a plan view of the nut.
Figure 7C:
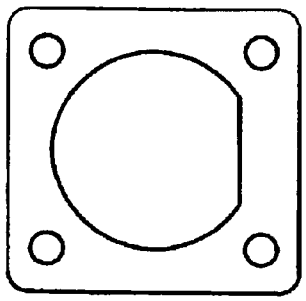
FIG. 7C is a plan view of a gasket for being received over a cylindrical part with a flat.

In yet a further embodiment of the invention shown in FIGS. 6 and 7, the bushing assembly is held in angular relation to the transformer casing.

It is desirable for a bushing to be able to be held in angular relation to a transformer casing. This angular configuration is usually achieved by providing a modified transformer casing with a gusset upon which a porcelain bushing is seated. Transformer casings which are modified to include a gusset are expensive and time consuming to construct. Prior art porcelain bushings and assemblies have so far been unable to meet this desire.

The present applicants cast resin bushing assembly can be cast in an angular or bifurcated configuration so as to locate within a transformer casing at an angle and accommodate a conventional transformer casing. In this way transformer casings need not be modified to accommodate prior art porcelain bushings in angular relation.

In this preferred embodiment the bushing can be located at an angle of up to at least 50° to the transformer casing.

The claims, illustrations, photographs and drawings, if any, form part of the disclosure of this specification as does the description, claims, illustrations, photographs and drawings of any associated provisional or parent specification or of any priority document, if any, all of which are imported hereinto as part of the record hereof.

Finally it is to be understood that various alterations, modifications and/or additions may be incorporated into the various constructions and arrangements of parts without departing from the spirit and admit of the invention.

What is claimed is:

1. An improved cast resin busing assembly for use in a transformer including:

a bushing which includes locating means for aligning the bushing assembly within a transformer casing;

said busing further comprising locking means for releasably securing the bushing assembly to said transformer casing;

said locking means including a threaded section moulded into the bushing that is adapted to be engaged by a collar inside said transformer casing;

a bushing conductor integrally moulded to said bushing; and a bushing flange in circumferential arrangement with the bushing.

2. An improved cast resin bushing assembly according to claim 1 wherein the bushing assembly is cast in a one step moulding.

3. An improved cast resin bushing assembly according to claim 1 wherein the threaded section of the bushing and the collar are cast from a singular resin moulding so as to form complementary engageable components.

4. An improved cast resin bushing assembly according to claim 1 wherein the locating means is a groove or flat position on the bushing for aligning the bushing assembly within an opening in said transformer casing.

5. An improved cast resin bushing assembly according to claim 1 wherein the bushing flange is adapted to be mounted on said transformer casing.

6. An improved cast resin bushing assembly according to claim 1 wherein the bushing flange includes locking holes which can be used as additional alternate means of securing the bushing assembly to the transformer casing.

7. An improved cast resin bushing assembly according to claim 1 wherein the bushing flange and the bushing constitute a single moulded piece.

8. An improved cast resin bushing assembly according to claim 1 wherein the flange is substantially annular and has an outside diameter larger than the transformer opening.

9. An improved cast resin bushing assembly according to claim 1 wherein the bushing conductor is cast integrally within the bushing.

10. An improved cast resin bushing assembly according to claim 1 wherein the cast resin system is selected from epoxy, phenolics, polyester, vinylester, polyurethane and related composites.

11. An improved cast resin bushing assembly according to claim 1 wherein the collar can be a cast resin nut or cyclo nut.

12. A method of releasably securing an improved cast resin bushing assembly to a transformer casing having an opening by providing:

a bushing which includes locating means for aligning the bushing assembly or part thereof within said opening in said transformer casing;

the bushing further includes locking means for releasably securing the bushing assembly to said transformer casing; the locking means including a threaded section moulded into the bushing which is adapted to be engaged by a collar inside said transformer casing;

a bushing conductor integrally moulded to said bushing; and a bushing flange in circumferential arrangement to the bushing;

said method including the steps of:

positioning said locating means on said bushing within said opening in said transformer casing so as to align said bushing assembly;

mounting said bushing flange on an outside surface surrounding the opening in said transformer casing; and, releasably securing the bushing assembly within the transformer casing by engaging said locking means inside the transformer casing.

13. A method of releasably securing an improved cast resin bushing assembly to a transformer casing according to claim 12 wherein the bushing assembly is cast in a one step moulding.

14. A method according to claim 12 wherein the threaded section of the bushing and the collar are cast from a singular resin moulding so as to form complementary engageable components.

15. A method according to claim 12 wherein the collar can be a cast resin nut or cyclo nut.

16. A method according to claim 12 wherein the locating means is a groove or flat position on the bushing for aligning the bushing assembly within an opening in said transformer casing.

17. A method according to claim 12 wherein the bushing flange is adapted to be mounted on said transformer casing.

18. A method according to claim 12 wherein the bushing flange includes locking holes which can be used as additional or alternate means of securing the bushing assembly to the transformer casing.

19. A method according to claim 12 wherein the bushing flange and the bushing constitute a single moulded piece.

20. A method according to claim 12 wherein the flange is substantially annular and has an outside diameter larger than the transformer opening.

21. A method according to claim 12 the bushing conductor is cast integrally within the bushing.

22. A method according to claim 12 wherein the cast resin system is selected from epoxy, phenolics, polyester, vinylester, polyurethane and related composites.

23. A method of releasably securing an improved cast resin bushing assembly to a transformer casing having an opening by providing a bushing assembly including:

a bushing which is formed from a cast resin polymer and which includes locating means defined by one of a groove or flat portion for aligning the bushing assembly or part thereof within said opening in the transformer casing;

the bushing further includes a threaded section for securing the bushing assembly to the transformer casing;

a threaded collar;

a bushing conductor integrally moulded to said bushing; and a bushing flange in circumferential arrangement with the bushing;

said method includes the steps of:

positioning said locating means on said bushing within said opening in said transformer casing so as to align said bushing assembly;

mounting said bushing flange on an outside surface surrounding said opening in said transformer casing; and, releasably securing the bushing assembly within the transformer casing by engaging the threaded section on the bushing on the inside of the transformer casing with the threaded collar.

24. An improved cast resin bushing assembly for use in a transformer including:

a bushing which is made from a cast resin polymer, which is cast in angular or bifurcated construction relative to a transformer casing and which includes located means for aligning the bushing assembly within the transformer casing;

said busing further comprising locking means for releasably securing the bushing assembly to said transformer casing;

a bushing conductor integrally moulded to said bushing; and a bushing flange in circumferential arrangement with the bushing.

25. An improved cast resin bushing assembly for use in a transformer including:

a bushing which includes locating means for aligning the bushing assembly within a transformer casing;

said bushing being cast from a cycloaliphatic epoxy resin system;

said busing further comprising locking means for releasably securing the bushing assembly to said transformer casing;

a bushing conductor integrally moulded to said bushing;

a bushing flange in circumferential arrangement with the bushing.

26. A method of releasably securing an improved cast resin bushing assembly to a transformer casing having an opening by providing:

a bushing which includes a locating means for aligning the bushing assembly or part thereof within said opening in said transformer casing; the bushing further includes a locking means for releasably securing the bushing assembly to said transformer casing;

a bushing conductor integrally moulded to said bushing; and a bushing flange in circumferential arrangement to the bushing; positioning said locating means on said bushing within said opening in said transformer casing so as to align said bushing assembly;

and said method comprising the steps of:

casting said bushing from a cycloaliphatic epoxy resin system;

mounting said bushing flange on an outside surface surrounding the opening in said transformer casing; and, releasably securing the bushing assembly within the transformer casing by engaging said locking means inside the transformer casing.

* * * * *